United States Patent [19]
Dehler

[11] 3,848,923
[45] Nov. 19, 1974

[54] SAFETY LOCKING DEVICE FOR AUTOMOBILE RECLINING SEATS

[75] Inventor: Bernhard Dehler, Coburg/Bayern, Germany

[73] Assignee: Metallwerk Max Brose & Co., Bayern, Germany

[22] Filed: July 30, 1973

[21] Appl. No.: 384,021

[30] Foreign Application Priority Data
Aug. 7, 1972 Germany............................ 2238899

[52] U.S. Cl................................. 297/366, 297/379
[51] Int. Cl................................................ A47c 1/25
[58] Field of Search ........... 297/366, 367, 379, 388; 16/146, 147

[56] References Cited
UNITED STATES PATENTS

| | | | |
|---|---|---|---|
| 3,259,433 | 7/1966 | Werner | 297/379 X |
| 3,294,446 | 12/1966 | Fontaine | 297/388 |
| 3,299,466 | 1/1967 | Werner | 297/366 X |
| 3,343,765 | 9/1967 | Baker | 297/388 X |
| 3,433,524 | 3/1969 | Close | 297/379 X |
| 3,439,932 | 4/1969 | Lewis et al. | 297/388 X |
| 3,758,044 | 9/1973 | Nilsson | 297/388 X |

FOREIGN PATENTS OR APPLICATIONS
1,925,778 1970 Germany ............................ 297/366

*Primary Examiner*—Paul R. Gilliam
*Assistant Examiner*—William E. Lyddane
*Attorney, Agent, or Firm*—Toren, McGeady and Stanger

[57] ABSTRACT

The reclining seats of a motor vehicle, which include a stationary section and a reclining section pivotally connected to said stationary section, are provided with a safety locking device whereby a ratchet wheel mounted with said reclining section may be engaged by a locking pawl upon sudden motion of the motor vehicle to prevent undesired pivotal movement of the reclining section of the seat. The ratchet wheel is mounted to rotate with the reclining section and the pawl is mounted upon the stationary section of the seat in a position to engage the ratchet wheel. Spring means normally bias the pawl out of engagement with the ratchet wheel and actuating means which are mounted for displacement in response to sudden movements of the motor vehicle operate to urge the pawl into locking engagement with the ratchet wheel to prevent tilting of the reclining section.

19 Claims, 17 Drawing Figures

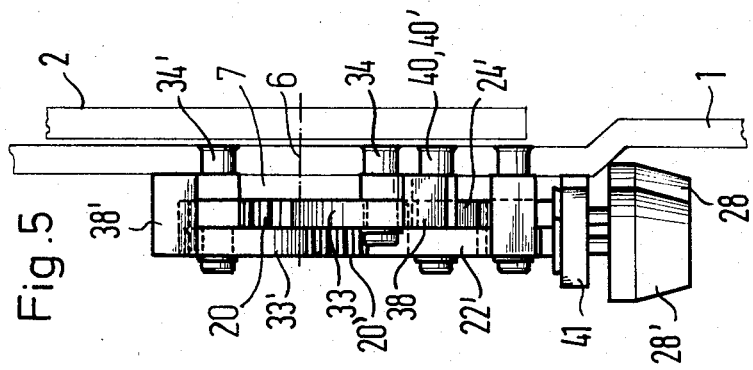
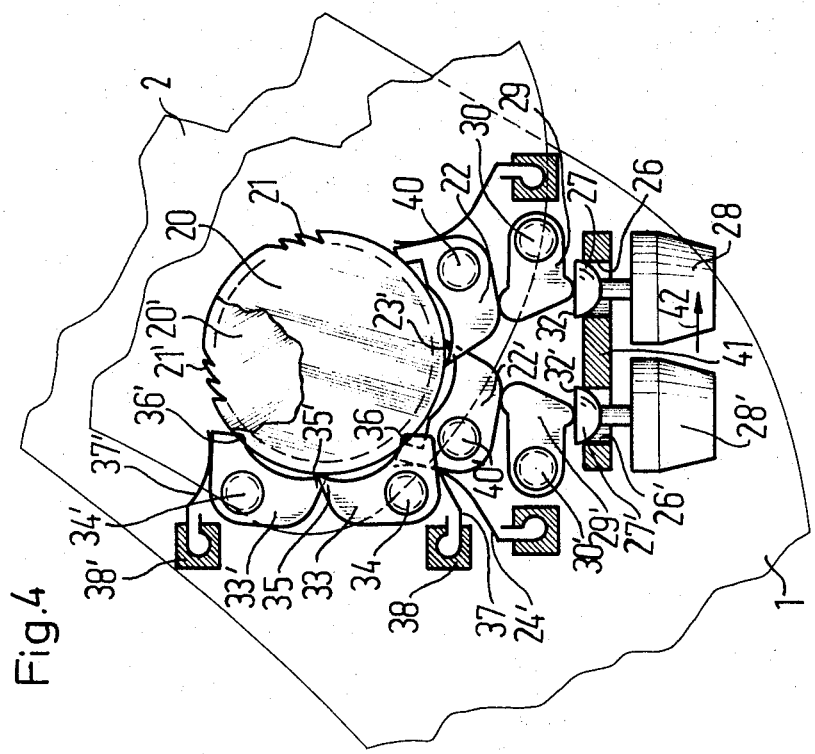

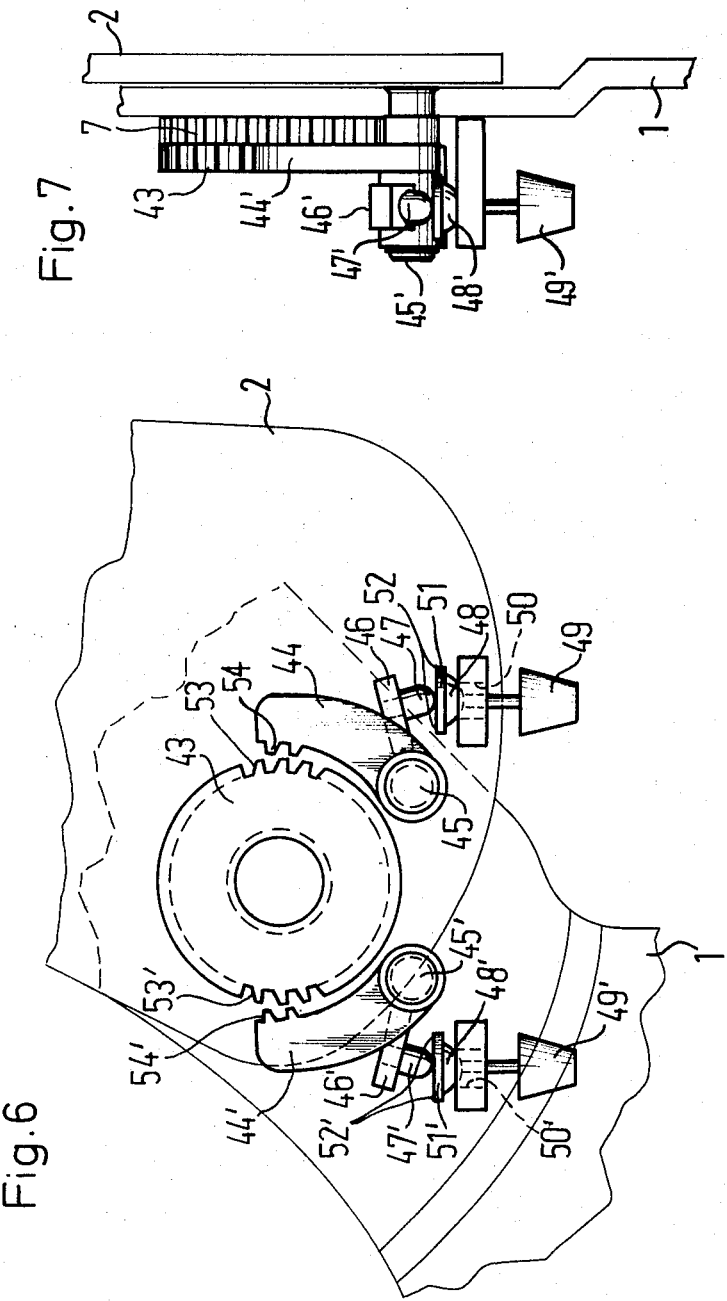

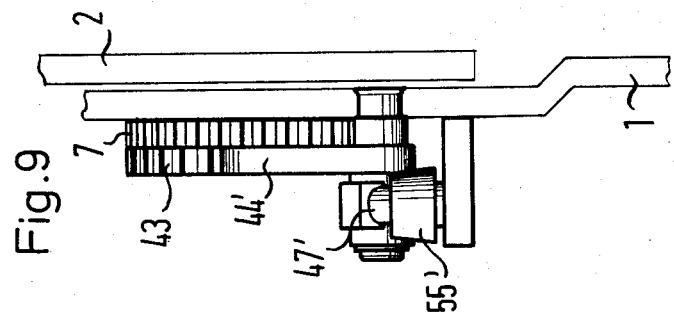
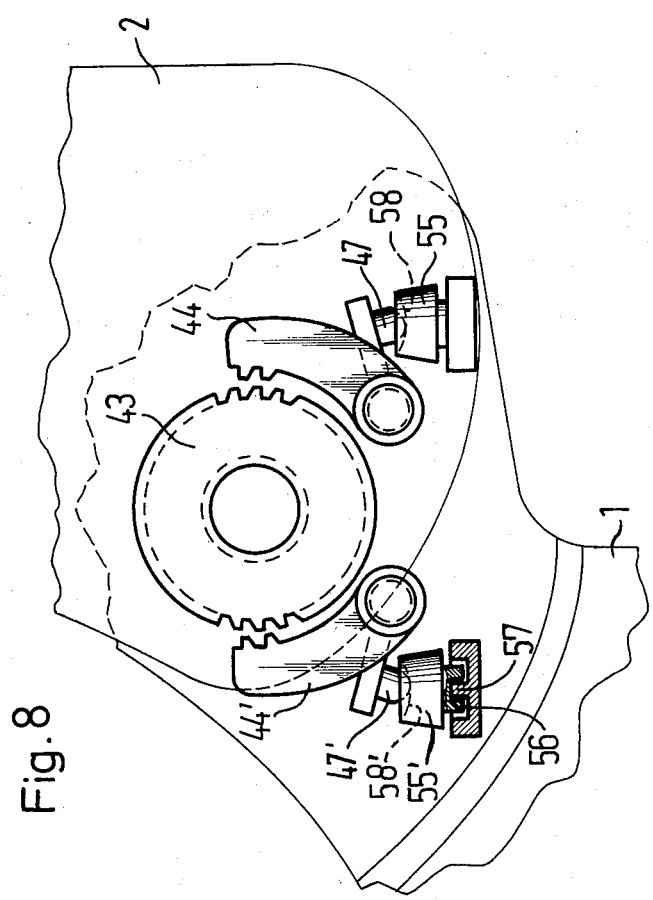

SAFETY LOCKING DEVICE FOR AUTOMOBILE RECLINING SEATS

The present invention relates generally to safety locking devices for reclining seats in motor vehicles and, more particularly, to a device whereby the reclining portion of the seat which is pivotally mounted upon a stationary portion thereof may be secured or locked relative to the stationary portion when sudden acceleration or deceleration of the motor vehicle occurs.

The present invention comprises a safety locking device which is applied to a reclining motor vehicle seat to operate in conjunction with, and in addition to, the normal locking device which is provided to enable manual engagement and release of the reclining portion of the seat. In the operation of the present invention, the two interconnected parts of the seat will be movable with respect to one another by operation of the normal locking device which may be manually operated to permit positioning of the reclining portion of the seat. However, regardless of the position of the ordinary manual locking device which is provided, the safety locking device of the present invention will operate to insure locking in place of the reclining portion of the seat when sudden accelerations or decelerations of the vehicle occur, without interfering with the ordinary operation of the manual locking device which is provided.

In automobile seats of the type in which the present invention may be provided, the reclining portion of the seat is usually mounted on a bottom stationary portion by a shaft which is necessarily rotated upon tilting of the reclining portion. In accordance with the present invention, at least one ratchet wheel having a cooperating pawl actuated by momentum forces caused by sudden movement of the vehicle is mounted upon the shaft which pivotally connects the reclining and stationary portions of the seat. Thus, the ratchet wheel is necessarily rotated upon tilting of the reclining seat back. Thus, an essential aspect of the invention is considered to be the fact that upon a shaft necessarily rotated by relative movement between sections of the seat there is mounted a ratchet wheel cooperating with the pawl which is actuated by momentum forces. As a result of the design of the present invention it becomes impossible, even if the ordinary locking device of the seat is released, for example, in the case of a deceleration of the motor vehicle, for the back of the seat to become freely movable, thereby giving rise to a hazardous situation. This can occur, for instance, upon sudden braking if a passenger seated in the rear of the motor vehicle is resting against the back of his seat when the ordinary locking device of the adjustable back is accidentally released.

The ordinary locking device of a reclining automobile seat may comprise a pinion which is pivotally mounted to the fitting of the stationary section of the seat. The pivotal portion of the seat may be equipped with a fitting having internal gearing which is concentric to the axis of rotation of the pivotal or reclining seat back. The pinion is usually mounted upon the shaft which pivotally connects the reclining seat back to the stationary section of the seat. Engagement between the pinion and the internal gearing controls the ordinary reclining action of the seat. In such a case, the ratchet wheel of the present invention may be preferably mounted upon the pivot shaft which carries the pinion of the normal seat locking device.

In one exemplified embodiment of the present invention, a pawl pivotally mounted adjacent the ratchet wheel is provided with a lever connected to a balancing element that can be swung in the longitudinal plane of the vehicle and which, in its deflected condition, will cause the pawl to engage the teeth of the ratchet wheel. Such an actuating motion of the pawl is simple and dependable. In order that the reclining portion of the seat may be secured relative to the stationary portion of the seat, both with respect to forward as well as rearward movements, there is provided, as a further aspect of the invention, a pair of pawls each of which will be actuated by acceleration and deceleration of the vehicle, respectively. In this aspect of the invention, the pawls are oriented into different directions so as to engage the ratchet wheel either in the case of vehicle acceleration or deceleration.

The ratchet wheel is provided with saw teeth and the pawl is appropriately provided with a suitably designed engaging portion.

Additionally, more than one ratchet wheel may be provided, each having saw teeth sloped in a counterrotative direction with respect to each other. In such a case, a separate pawl is provided for each ratchet wheel.

However, in accordance with the invention, it is in principle possible to have two pawls acting at opposite sides of a common ratchet wheel. In such a case, the ratchet wheel may be provided over a part of its circumference with saw teeth sloped in one direction and along another part of its circumference with saw teeth sloped in an opposite direction. It is possible to have this type of arrangement of the ratchet wheel for the reclining portion of the seat in view of the fact that the pivotal back portion of the seat is adjustable over a certain angular range and, as a result, it is possible to arrange differentially sloped saw teeth upon a single ratchet wheel.

This type of arrangement involving differentially sloped saw teeth on a single ratchet wheel, which is a costlier solution from the point of view of manufacture, can be avoided by providing a ratchet wheel having uniformly shaped plain teeth with its engaging pawl having correspondingly designed engaging elements.

A preferred embodiment of the present invention involves a device wherein both pawls are combined in a single unitary member which comprises a forked configuration engaging both sides of the ratchet wheel. In such a device, the forked element is made pivotal upon motion of the motor vehicle and depending upon the direction in which the forked member is pivoted, it will engage one side or the other of the ratchet wheel.

Under certain aspects of the present invention wherein there may be provided either one pawl only or pawls actuated independently of each other, an oscillating element displaceable by movement of the vehicle may be designed as a two-armed lever having a lever arm situated above the point of rotation for engaging a control cam actuating the pawl either directly or by way of an intermediate element. The control cam may simply be designed in such a way that the extremity thereof situated above the pivot or oscillating point of the oscillating element is flattened to form a cam surface which operates in such a manner that the corners or ends thereof, upon deflection of the oscillating portion of the member, will deflect the pawl, either directly or indirectly, thereby controlling engagement of the pawl with the ratchet.

The oscillating element, which operates as the actuating means for controlling operation of the pawl of the present invention, may be configured as a pivotal member mounted to rotate about a pivot shaft. However, in accordance with other aspects of the invention, this actuating or oscillating element can be formed in a hemispherical configuration with an upward flattened bearing surface and a lower convex shape. A mounting member supports the actuating member by engagement with the lower convex portion thereof within an orifice having a diameter smaller than the outer diameter of the convex or hemispherical portion of the actuating element. The hemispherical element is freely mounted in the mounting member and may be displaced by sudden motion of the vehicle. This displacement causes movement of the hemispherical element by engagement of the lower convex hemispherical surface thereof with the smaller diameter hole and as a result of engagement between the upper bearing surface and the pawl, the pawl will be actuated to engage the ratchet wheel.

By another aspect of the invention, the oscillating element can be supported by means of a vertical blind hole seated on a pivot of smaller diameter with the upper surface of the actuating element configured with a tapered or hemispherical concave recess which is engaged by the pawl through a pressure element. The oscillating element, in this aspect of the invention, is also mounted to be movable or tilted by motion of the vehicle and as a result of the hemispherical concave surface, displacement of the oscillating element will cause actuation of the pawl in the manner heretofore described.

In order to insure that the pawl will not engage the ratchet wheel accidentally, or in response to forces which do not require that the seat back be locked in position, a spring is provided which maintains the pawl disengaged from the ratchet wheel during normal operation of the vehicle, but which will permit the actuating means of the invention to cause engagement of the pawl with the ratchet wheel to lock the seat back in position under proper circumstances.

In addition to insuring that the seat back is locked in position when sudden acceleration or deceleration of the vehicle occurs, the present invention also provides means for insuring that locking in place of the seat back will occur to prevent collapse of the reclining seat when a vehicle is stationary. For example, with the vehicle stationary, if the manual seat release mechanism should fail, collapse of the upright seat back could result in passenger injury. Accordingly, the device of the present invention includes means which require that adjustment of the seat back to a desired position be effected slowly. If the seat back is moved suddenly by a particularly rapid or shock-like movement, the present invention will operate to lock the seat in position thereby avoiding collapse of the seat back even when the vehicle is stationary.

The aspect of the present invention whereby this object is achieved involves an auxiliary locking device operating in cooperation with the locking device previously described which is intended to operate only upon sudden acceleration or deceleration of the vehicle. The auxiliary locking device comprises a two-armed pivotable locking pawl having an engaging tooth arranged on one arm and a sliding tooth arranged at the other arm. The sliding tooth is maintained by a spring in contact with the ratchet wheel at all times. The sliding tooth rides over the teeth of the ratchet wheel and this engagement causes the ratchet wheel to be periodically engaged by the pawl in a manner which will cause locking of the ratchet wheel if the ratchet wheel is rotated rapidly. However, if the ratchet wheel is rotated slowly, the pawl will move to become disengaged from the teeth of the ratchet wheel thereby permitting continued rotation thereof. Thus, when the seat back is moved rapidly, as would be the case when a malfunctioning of the manual locking device occurs, collapse of the seat back will be prevented since rapid rotation of the ratchet wheel will cause the engaging auxiliary pawl to lock the wheel in place whereby preventing seat collapse.

It should be noted that the device of the present invention need not necessarily be limited in its application to use with automobile seats. For example, the locking device could be used to adjust the elevation of seats or, in connection with raising or lowering of window panes.

Preferably, one locking pawl is provided for each direction of seat rotation. Each one of these locking pawls operates to control a different ratchet wheel if the wheel is provided with the appropriate saw teeth. In the case of a ratchet wheel provided with straight teeth, two locking pawls may be provided to control the operation of a single ratchet wheel.

A better understanding of the present invention, as well as other objects and aspects thereof, may be had from the following detailed description of the various embodiments of the invention illustrated in the accompanying drawings, in which:

FIG. 4 is a side elevation of the reclining seat fitting of the present invention showing portions thereof embodying the auxiliary safety lock;

FIG. 5 is a sectional view of the auxiliary safety lock illustrated in FIG. 4;

FIG. 6 is a side elevation of another embodiment of the present invention;

FIG. 7 is an end view of the embodiment depicted in FIG. 6;

FIG. 8 is a side elevation of a modification of the embodiment illustrated in FIG. 6;

FIG. 9 is an end view of the embodiment illustrated in FIG. 8;

Figure 1:
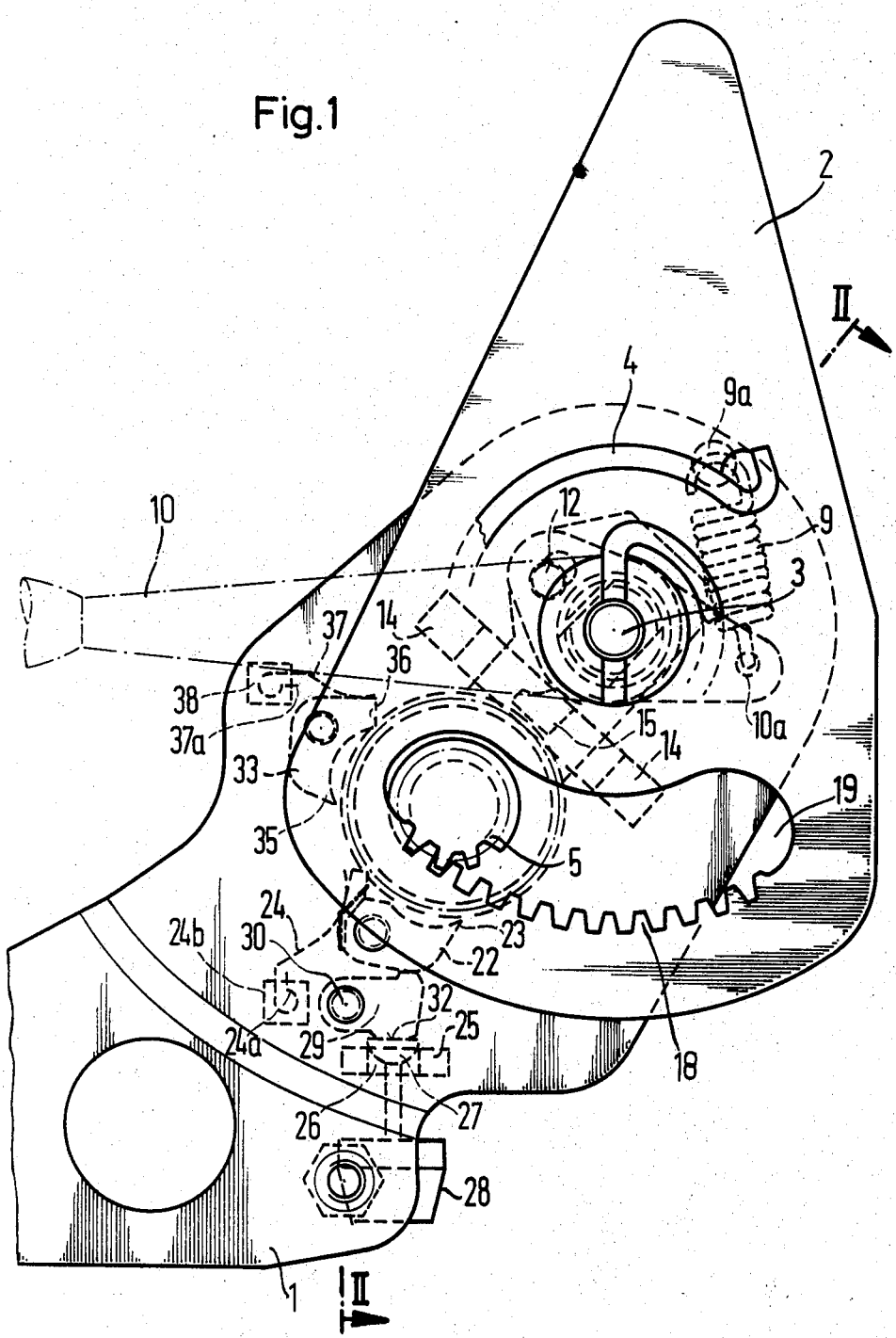
FIG. 1 is a side view of an automobile seat control mechanism embodying the principles of the present invention.
Figure 2:
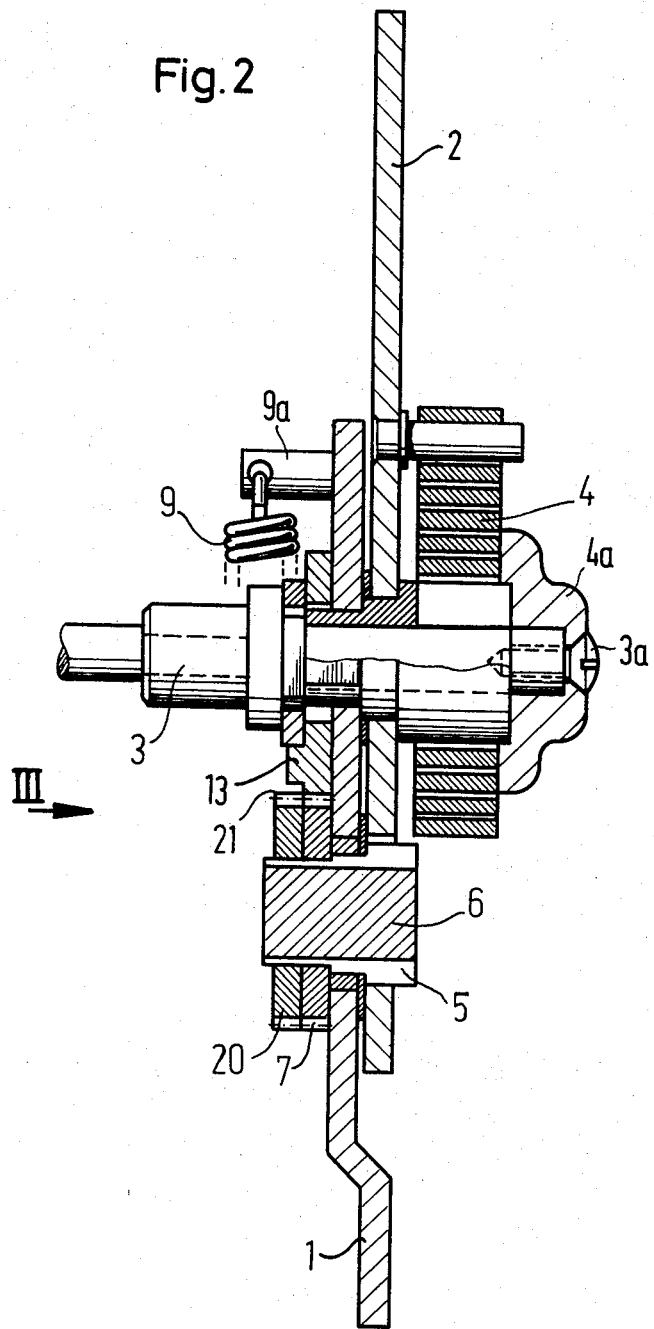
FIG. 2 is a sectional view taken along the line II—II of FIG. 1.
Figure 3:
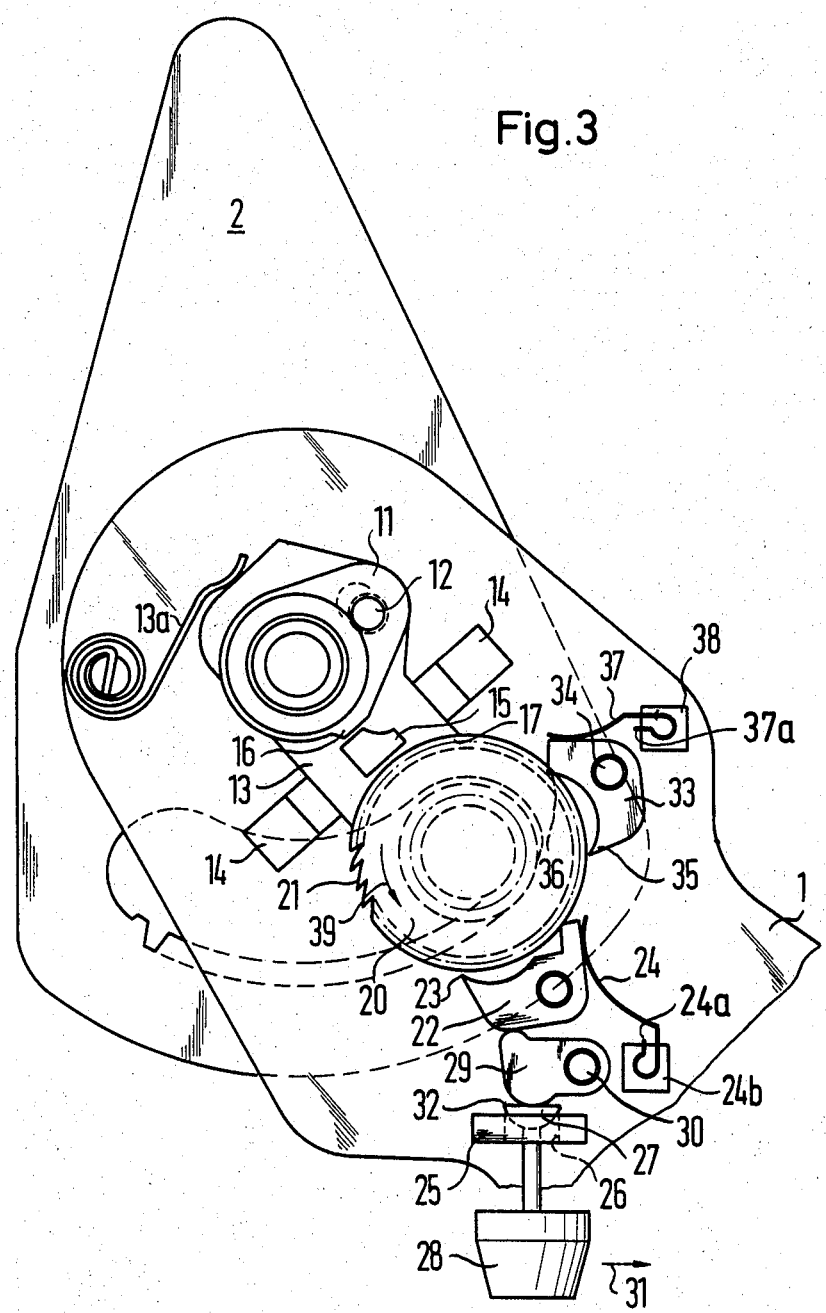
FIG. 3 is a side elevation of the embodiment of FIG. 1 as viewed from the direction of the arrow III shown in FIG. 2.

As illustrated in FIGS. 1–3, a mounting assembly for a reclining automobile seat comprises a stationary fitting 1 mounted to the seat frame or to the lower stationary portion of the seat, and a pivotable fitting 2 mounted to the upright seat back which comprises the pivotable or reclining portion of the seat. The fitting 2 is mounted for pivoting motion relative to the fitting 1 by a pin-jointed assembly including a pin 3. A coil spring 4 affixed at one end to the pin 3 and at the other end to the fitting 2, and secured by a cap 4a attached to the pin 3 by a screw 3a, is arranged in such a manner that the reclining seat back is biased to assume an upright position. On the stationary fitting 1 there is affixed a pinion 5 on a shaft 6 that is pivotally mounted and provided on the other side of the fitting with a gear 7 locked by means of a locking jaw 13 that is biased into the locked position by a spring 13a against the action of a spring 9 loading a manual lever 10 but which can be moved out of the locked position by operation of the manual lever 10 provided with a cam 11 connected by a pin 12 with the locking jaw 13 guided between two tracks 14 at the stationary fitting and having a lug 15 cooperating with a lug 16 of the cam 11 for the purpose of securing the locking jaw 13 in the position in which it is engaged by means of the internal gearing 17, provided at its lower end, with the gear 7 connected to the shaft 6 in a manner which resists twisting thereof. Spring 9 is a spiral spring and engages at one bent end a hole 10a of the manual lever 10 and at the other end a pin 9a rigidly connected to fitting 1. As a result of the engagement of the locking jaw 13 with the gear 7, the pinion 5 mounted on the identical shaft 6 is locked in position. The pinion 5 engages an internal gearing 18 arranged concentrically with the shaft 3. The internal gearing 18 is provided in the pivotable fitting 2 and comprises a cut-out section 19 which accommodates the pinion 5. Even if the locking jaw 13 becomes disengaged, the fitting 2 can be pivoted with the pivot 5 hobbing along the internal gearing 18, carrying with it in the process the shaft 6 with the gear 7. If the lever 10 is re-engaged, the spring 9 moves the locking jaw 13 into re-engagement whereby the gear 7 is locked thereby effecting locking of the fitting 2 and manual positioning of the reclining seat back.

The mechanism previously described comprises the normal manual adjusting means whereby the reclining seat back may be placed in a desired position and locked in place during normal operation of the vehicle.

In order to prevent undesired collapsing of the seat back, as might occur upon sudden braking of the motor vehicle, there is provided in accordance with the present invention a safety locking device which is actuated by momentum produced through movement of the vehicle. This safety lock comprises a ratchet wheel 20 provided with saw teeth 21 affixed to the shaft 6. A locking pawl 22, pivotally mounted adjacent the ratchet wheel 20 on the stationary fitting 1 cooperates with the ratchet wheel 20. The pawl 22 is provided with an engaging tooth 23 shaped in conformity with the teeth of the ratchet wheel and adapted to engage said teeth for locking the ratchet wheel in position. A leaf spring 24 which is retained with a hairpin-shaped end 24a in a correspondingly-shaped recess of a support 24b at fitting 1, is mounted to bias the locking pawl out of engagement with the teeth of the ratchet wheel 20 during normal operation of the seat.

At the stationary fitting 1 there is provided a mounting member 25 having a bore 26 shaped to accommodate a bearing element 27 of a hemispherically-shaped actuating element 28. The bearing element 27 comprises a hemispherical convex surface having an outer diameter which is greater than the diameter of the supporting bore 26. An upper flattened cam section 32 of the actuating element 28 cooperates with an intermediate member 29 pivotally mounted about a pin 30 to engage the pawl 22. Motion of the motor vehicle will impart a momentum to the element 28 and when a sudden change, for example, by sudden deceleration of the vehicle, occurs in the vehicle motion, the actuating element 28 will be displaced in the direction of the arrow 31. The bearing surface 27 of the element 28 by virtue of its engagement with the bore 26 will cause the element 28 to move upwardly when the element 28 is deflected in the direction of the arrow 31 by sudden deceleration of the vehicle. The intermediate member 29 will thus be pivoted thereby causing the pawl 22 to pivot thus driving the engaging tooth 23 into engagement with the teeth 21 of the ratchet wheel 20. The saw teeth 21 of the ratchet wheel 20 are sloped in a direction to enable engagement of the pawl 22 with the wheel 20 to lock the shaft 6 against movement in a direction corresponding to a forward collapsing of the seat back. In this manner, the reclining seat back is secured upon braking of the vehicle against collapse even if the normal manual locking device is released. This will prevent forward collapsing of the reclining portion of the seat even if a passenger seated in the back seat of the vehicle is propelled forward against the upright portion of the front vehicle seat.

In order to secure the seat back against undesired collapse when the vehicle is stationary, an auxiliary locking assembly is provided. This assembly comprises a locking pawl 33 which is pivotally mounted by means of a pin 34 at the stationary fitting 1. The locking pawl 33 is configured as a twin-armed lever and has a ratchet wheel engaging tooth 35 forming one arm of the lever which cooperates with the saw teeth of the ratchet wheel. A sliding tooth 36 forming the second arm of the lever is provided on the opposite side of the pivotal mounting 34. The locking pawl 33 is biased by a leaf spring 37 mounted with its bent end 37a in a support 38 on the stationary fitting 1 in such a manner that the sliding tooth 36 bears against the saw teeth 21. As the ratchet wheel 20 is rotated, the teeth of the wheel abutting against the sliding tooth 36 cause pivoting of the pawl 33 to move the engaging tooth 35 into a position to lock the ratchet wheel 20 against further rotation. If rotation of the ratchet wheel occurs slowly, sufficient time will be provided for spring 37 to drive the engaging tooth 35 out of engagement with the ratchet wheel teeth 21 thereby permitting continued rotation of the ratchet wheel. However, rapid rotation of the ratchet wheel will impart sharp pivotal forces to the pawl 33, overcoming the biasing effect of the spring 37 and causing locking of the ratchet wheel by engagement of the tooth 35 with the teeth 21. Rotation of the ratchet wheel 20 in the direction of the arrow 39 corresponds to a collapsing forward motion of the reclining seat back. When the seat is to be adjusted to a new position, if this adjustment occurs slowly, continued rotation of the ratchet wheel 20 will occur and no locking of the seat back will be effected. However, if the seat is moved rapidly, the engagement of the ratchet wheel against the sliding tooth 36 will sharply propel the engaging tooth 35 into engagement with the teeth 21 of the ratchet wheel and lock the seat against further forward movement. Thus, if the seat is rapidly moved for any reason, even with the vehicle stationary, a safety locking action will occur by virtue of operation of the auxiliary locking device previously described.

In the embodiment of the invention shown in FIGS. 4 and 5, a ratchet wheel 20' is provided in addition to the ratchet wheel 20. The ratchet wheel 20' is formed with saw teeth 21' pitched or sloped in a direction opposite to the direction of the saw teeth 21 of the ratchet wheel 20. A pawl 22' pivotally mounted on a pin 40', which conforms with the pin 40 of the pawl 22, cooperates with the ratchet wheel 20'. In this embodiment, there is provided a common support element 41 having bearing bore holes 26 and 26' which accommodate bearing elements 27 and 27' of the actuating elements 28 and 28'. The actuating element 28' cooperates with an intermediate member 29' which engages an upper cam surface 32' formed on a hemispherical control element 27'. The intermediate member 29' is pivotally mounted on a pin 30' affixed to the stationary fitting 1. It should be noted that both the actuating members 28 and 28' are formed with a lower section shaped as a truncated cone mounted to depend from the bearing element 27 and 27'. Thus, a pendulum effect is achieved due to the structural configuration of the actuating elements 28 and 28'. When the actuating element 28' is deflected in the direction of the arrow 42, as would occur upon a sudden acceleration of the vehicle, the upper cam surface 32' will be raised and will operate to cause engagement of the pawl 22' with the saw teeth 21' of the ratchet wheel 20. This mode of operation is similar to that described in connection with the actuating element 28. The locking pawl 22' is biased by a leaf spring 24' to maintain an engaging tooth 23' disengaged from the saw teeth 21' so long as no severe accelerative forces occur to cause displacement of the actuating element 28'. As a result of this additional structure, the pin 6 will be secured in the event of severe vehicle acceleration in addition to the securing action which occurs upon severe deceleration despite the fact that the manual locking device may become disconnected by an accidental lifting of the manual lever 10.

In addition to the auxiliary locking device comprising the pawl 33, tooth 35, tooth 36, pin 34 and spring 37, there is also provided a second auxiliary locking device which is a mirror-image structure of the aforementioned arrangement but identical therewith in other respects. This second auxiliary locking device comprises a locking pawl 33', a locking tooth 35', a sliding tooth 36' with the pawl 33' being pivotally mounted upon a pin 34' fixed to the stationary fitting 1. The pawl 33' is also biased by a spring 37' mounted in a support element 38'. By operation of this second auxiliary locking device which cooperates with the ratchet wheel 20', the back of the seat is secured during disconnection of the manual locking assembly against excessively rapid rearward collapsing even when the vehicle is stationary. It will be seen that the operation of this second auxiliary locking device is similar to the first auxiliary locking device previously described except for the obvious reversal of elements clearly depicted in the drawing.

An additional embodiment of the locking device of the present invention operated by vehicle momentum is depicted in FIGS. 6 and 7. As shown therein, in addition to the gear 7 there is also provided a ratchet wheel 43 cooperating with two pawls 44 and 44' pivotally mounted about pins 45 and 45', respectively, at the stationary fitting 1. The pawls are provided with levers 46 and 46' including bearing elements 47 and 47'. A pair of actuating members 49 and 49' are provided to include upper bearing elements 48 and 48' which are engaged by the pressure elements 47 and 47'. The elements 48 and 48' are shaped as hemispheres having lower convex hemispherical surfaces which are mounted in corresponding support bore holes 50 and 50' defined in support elements similar to the support elements 25 and 41. The upper surfaces of the elements 48 and 48' comprise flattened cam sections 51 and 51' whose upper surfaces form control cams 52 and 52' which move upwardly to lift the pressure elements 47 and 47' when the vehicle momentum causes displacement of the actuating elements 49 and 49' thereby to cause engagement of the locking pawls 44 and 44' with the ratchet wheel 43. The ratchet wheel 43 is provided along its circumference with sawteeth 53 sloped in a first direction and, along another portion of its circumference with sawteeth 53' sloped in an opposite direction. The teeth 53 and 53' cooperate with sections formed as correspondingly shaped internal gears 54 and 54' arranged upon the pawls 44 and 44'. Thus, despite disengagement of the manual locking device, the reclining seat back will be secured against unwanted movement in the event of either an acceleration or deceleration of the vehicle.

In a further embodiment of the invention depicted in FIGS. 8 and 9, which corresponds in several respects to the embodiment depicted in FIGS. 6 and 7 except with regard to the design of the actuating element, actuating members 55 and 55' are arranged to cooperate with the pawls 44 and 44'. The members 55 and 55' are designed in the shape of a truncated cone having a cylindrical attachment provided with a blind hole 56 in which the actuating elements 55 or 55' are fitted upon a pivot 57 having a smaller diameter than the blind hole 56. As a result of the configuration of the pivot 57, the respective actuating elements are capable of rocking to a certain extent thereby causing the cooperating pawls 44 and 44' to be moved in a manner which causes actuation of the pressure elements 47 and 47' arranged, respectively, in spherical recesses 58 and 58' formed at the upper ends of the actuating elements 55 and 55'. In the event of a rocking or oscillation of the actuating elements 55 and 55' resulting from acceleration or deceleration of the vehicle, the related pressure elements 47 or 47' will be lifted as a result of the concave shape of the upper end of the structure and the appropriate locking pawl will be forced into engagement with the teeth of the ratchet wheel 43.

Figure 11:
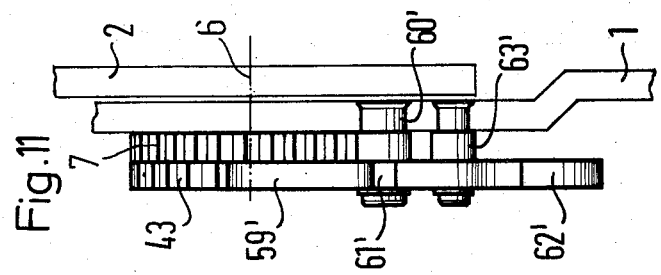
FIG. 11 is an end view of the embodiment illustrated in FIG. 10.
Figure 10:
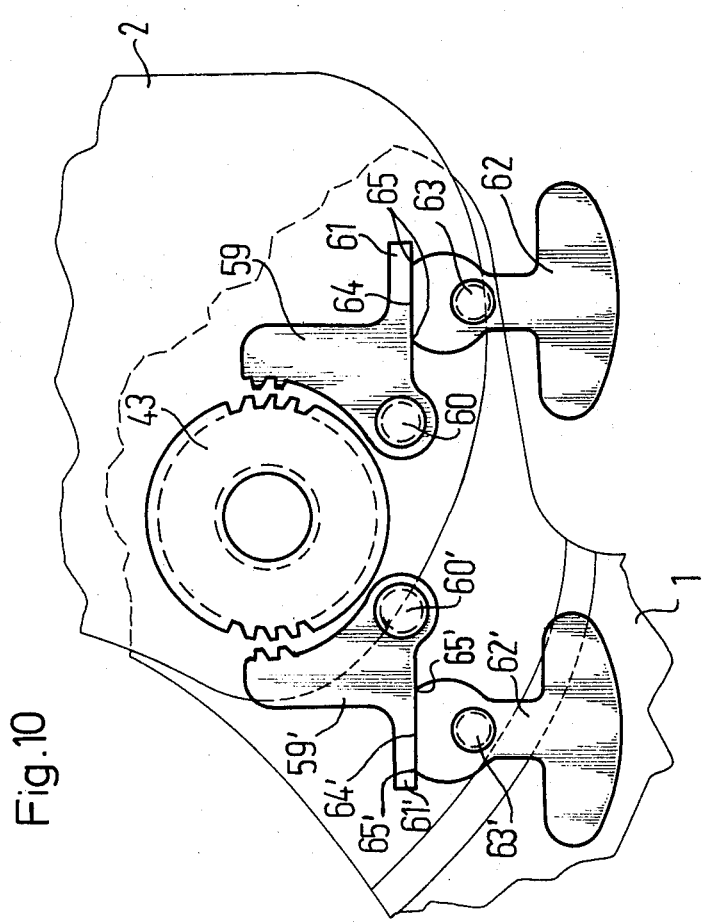
FIG. 10 is a side elevation of a further embodiment of the present invention.

By a further embodiment of the invention depicted in FIGS. 10 and 11, the ratchet wheel used in connection therewith corresponds with that of the embodiments depicted in FIGS. 6–9 and it is therefore identified by the identical reference numeral 43. As is the case in the embodiments depicted in FIGS. 6-9, the embodiment of FIGS. 10 and 11 comprises a pair of pawls 59 and 59' having internal gear teeth thereon and pivotally mounted upon pins 60 and 60' upon opposite sides of the ratchet wheel 43. The pawls 59 and 59' are provided with correspondingly shaped levers 61 and 61' cooperating with respective actuating elements 62 and 62' pivotally supported upon pins 63 and 63', respectively, arranged in each case to be parallel to the pins 60 and 60'. The actuating members 62 and 62' are in the general shape of an anchor and have formed above the swivel pins 63 and 63' a section which may be generally spherical in configuration and which is provided with flattened sections 64 and 64' having edges 65 and 65' which operate as control cams whereby, upon deflection of the actuating element, the cam surfaces 65 and 65' will act upon the respective levers 61 or 61' to actuate the pawls 59 or 59' to engage the ratchet wheel 43 with their internal gearing. Accordingly, upon a certain acceleration or deceleration of the vehicle, either of the actuating elements 62 or 62' will pivot about their pivot pins 63 or 63' in a pendulum-like motion thereby elevating either of the levers 61 or 61' to effect locking of the ratchet wheel 43 to secure the reclining seat back in position. As in the case of the embodiments depicted in FIGS. 6 to 9, both pawls cooperate with the same ratchet wheel 43 which, in addition to the gear 7 forming part of the manual locking device, is arranged upon the pin 6.

Figure 13:
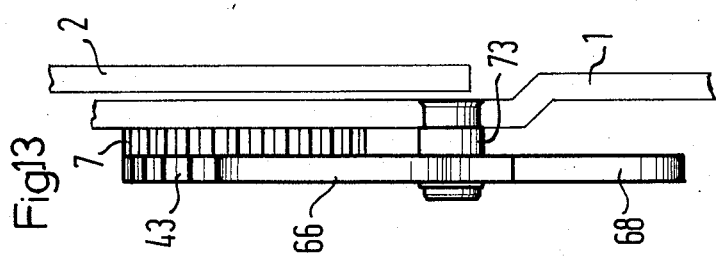
FIG. 13 is an end view of the embodiment illustrated in FIG. 12.
Figure 12:
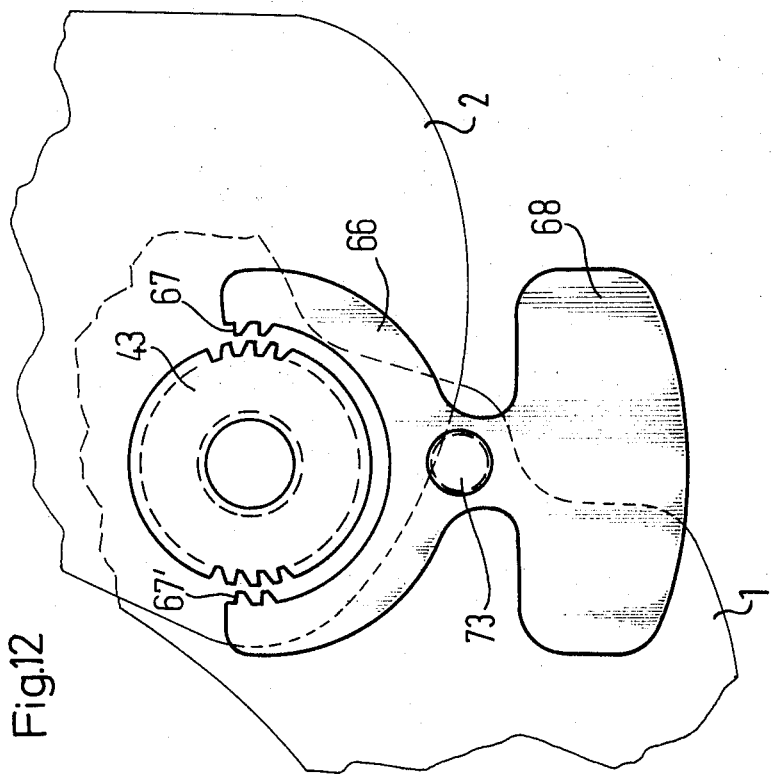
FIG. 12 is a side elevation of a further embodiment of the present invention.

The further embodiment of the present invention depicted in FIGS. 12 and 13 corresponds with respect to the arrangement and design of the single ratchet wheel 43 to the embodiments depicted in FIGS. 6-11 and deviates therefrom only with regard to the design of the pawl and the actuating element. In FIGS. 12 and 13 the pawls are shown formed into a single integral element which comprises a generally fork-like shape 66 arranged to grip the ratchet wheel 43 on both sides thereof. Each of the pawls of the fork 66 are provided at their extremities with teeth 67 and 67' alternatingly engaging the teeth of the ratchet wheel 43. The overall structure is designated as the actuating element 68 having a pivotal pin 73 which mounts the element for pendulum-like rotation caused by sudden acceleration or deceleration of the motor vehicle. Accordingly, depending upon the momentum forces imparted to the actuating element 68 by movement of the vehicle determining the direction of its displacement, the fork 66 will engage the ratchet wheel 43 with either the teeth 67 or the teeth 67' thereby effecting locking of the reclining seat back against the direction of motion which is to be prevented.

Figure 15:
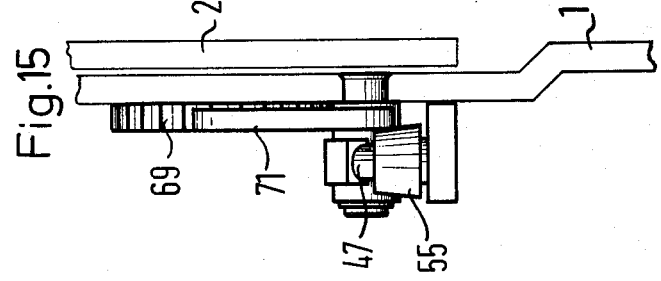
FIG. 15 is an end view of the embodiment illustrated in FIG. 14.
Figure 14:
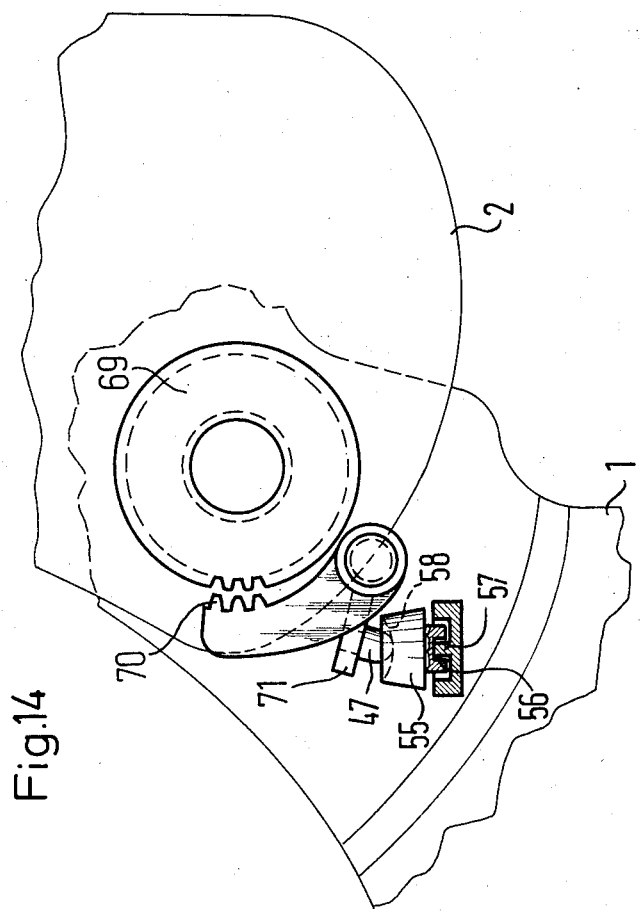
FIG. 14 is a side elevation of a further embodiment of the present invention.
Figure 17:
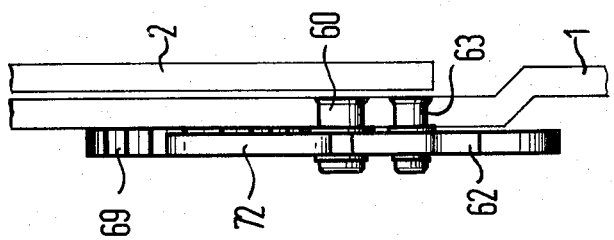
FIG. 17 is an end view of the embodiment illustrated in FIG. 16.
Figure 16:
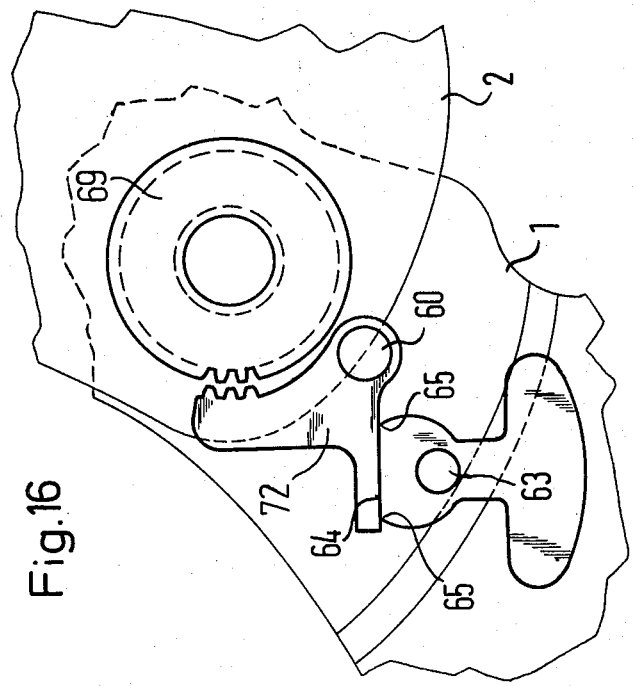
FIG. 16 is a side elevation illustrating another embodiment of the present invention.

The further embodiments of the invention depicted in FIGS. 14 and 15 and in FIGS. 16 and 17, involve modifications which are particularly advantageous with regard to actuation of the locking pawls and to the design and support of the actuating members. In the case of the embodiment depicted in FIGS. 14 and 15, the depicted arrangement generally corresponds to the embodiment previously described and depicted in FIGS. 8 and 9, while the embodiment depicted in FIGS. 16 and 17 bears a similarity to the previously described embodiment depicted in FIGS. 10 and 11. The two embodiments shown in FIGS. 14-17 have in common the design of the ratchet wheel 69 which comprises generally uniform straight gear teeth formed about the entire circumference thereof. As a result, the gearing 70 of the single pawls 71 or 72 is similarly designed as straight gear teeth having a symmetrical tooth structure. In this particular aspect of the invention, the ratchet wheel 69, because of the symmetry of its gear teeth, can be locked against motion in both directions by operation of a single locking pawl 71 or 72 and the design of the elements is not such that only locking in a preferred direction is possible. The related actuating members are capable of actuating the pawl in both directions of deflection in view of the fact that they have been constructed with a symmetrical design. A particularly advantageous feature of this mode of operation is that the ratchet wheel 69 serves at the same time as a ratchet wheel for the locking device of the type described above which is actuated by means of the manual lever 10. The provision of additional ratchet wheels is unnecessary because of the symmetrical design of the gearing which can be locked against rotation in both directions. The pawls, as will be seen from the embodiments described, are arranged in such a way that they are disengaged from the related ratchet wheel by the force of their own weight and become engaged only as a result of deflection of the pertinent actuating element. Thus, it will be seen that except for the differences in structure and operation heretofore discussed, the embodiments of FIGS. 14-17 will generally operate in a manner similar to the operation of the other embodiments previously described herein.

While specific embodiments of the invention have been shown and described in detail to illustrate the application of the inventive principles, it will be understood that the invention may be embodied otherwise without departing from such principles.

What is claimed is:

1. A safety locking device for reclining seats of a motor vehicle, said seats including a stationary section and a reclining section pivotally connected to said stationary section, said device comprising ratchet means mounted to rotate with said reclining section upon pivotal motion thereof, pawl means pivotally mounted relative to said stationary section in a position to enable engagement of said pawl means with said ratchet means to lock said ratchet means against rotation, means normally biasing said pawl means out of locking engagement with said ratchet means, and actuating means displaceable in response to abrupt motion of said motor vehicle for urging said pawl means into locking engagement with said ratchet means thereby to prevent pivotal motion of said reclining section.

2. A device according to claim 1 wherein said actuating means comprise a hemispherically-shaped member having a lower convex portion and an upper cam surface, said lower portion having an outer diametral dimension, a support member defining therein an opening having an outer diametral dimension smaller than the outer diametral dimension of said lower convex surface, said hemispherical member being mounted upon said support member in abutting relationship therewith with said lower convex surface extending into said opening and with said upper cam surface engaged to effect displacement of said pawl, said hemispherical member being displaceable upon abrupt motion of said motor vehicle by cooperating engagement between said lower convex surface and said support member to effect actuation of said pawl into locking engagement with said ratchet means.

3. A device according to claim 2 wherein said hemispherical member includes a lower pendulous portion extending below the abutment between said hemispherical member and said support member.

4. A device according to claim 1 wherein said reclining section is pivotally mounted to said stationary section by a pivot pin and wherein said ratchet means is mounted concentrically with said pivot pin to be rotatable with said reclining section.

5. A locking device according to claim 1 wherein said reclining seat includes a manually operable seat adjusting mechanism comprising a pinion rotatably mounted relative to said stationary section and gear means fixed relative to said reclining section and engaging said pinion in meshing engagement therewith, said ratchet means being mounted concentrically with said pinion by a common mounting structure.

6. A device according to claim 1 wherein said pawl means includes a lever arm positioned to be engaged by said actuating means to cause pivotal motion of said pawl upon displacement of said actuating means.

7. A locking device according to claim 1 wherein said pawl means comprise a pair of pawls each pivotally mounted upon an axis spaced perpendicularly from the axis of rotation of said ratchet means, each of said pawls being oriented to effect locking engagement with said ratchet means for different directions of acceleration of said vehicle.

8. A device according to claim 1 wherein said ratchet means comprise sawteeth and wherein said pawl means comprise an engaging tooth correspondingly shaped to engage said sawteeth.

9. A locking device according to claim 7 wherein said ratchet means include a pair of ratchet wheels each having sawteeth, with the teeth of one of said ratchet wheels sloped in the direction opposite to the slope of the teeth of said other ratchet wheel, each of said pawls being arranged to engage, respectively, one of said ratchet wheels.

10. A device according to claim 7 wherein each of said pawls is arranged to engage a common ratchet wheel at opposite sides thereof.

11. A device according to claim 10 wherein said common ratchet wheel has sawteeth sloped in a first direction extending over one portion of its circumference and sawteeth sloped in a direction opposite to said first direction over another portion of its circumference.

12. A device according to claim 1 wherein said ratchet means comprise a ratchet wheel having uniformly shaped straight gear teeth with said pawl means comprising correspondingly shaped gear teeth adapted to engage said ratchet wheel gear teeth.

13. A device according to claim 7 wherein said pawls are formed in a single integral structure in a forked configuration extending about opposite sides of said ratchet means, said integral forked configuration having a single pivotal mounting.

14. A device according to claim 1 wherein said actuating means comprises a pendulum body arranged to swing about a pivotal connection, said pendulum body having a portion thereof situated above said pivotal connection and including at least one surface acting as a cam surface in engagement to effect actuation of said pawl means.

15. A device according to claim 14 wherein said pendulum body includes a hemispherical bearing surface extending in a downward direction, said device further including mounting means having a support bore hole of a diameter smaller than the diameter of said hemispherical bearing surface, with said hemispherical bearing surface being mounted to extend into said bore hole and to engage said support member thereat to enable pendulous motion of said pendulum member.

16. A device according to claim 1 wherein said actuating means include a movable body having a vertical blind hole formed therein, a support member including a pivot element configured with a diameter smaller than the diameter of said blind hole, said movable body including an upper hemispherical recessed surface engaged to actuate said pawl means when said movable body is displaced about said pivot.

17. A device according to claim 1 wherein said means normally biasing said pawl means out of locking engagement with said ratchet means comprise spring means pivotally urging said pawl means in a direction away from said ratchet means.

18. A device according to claim 1 further including an auxiliary safety locking mechanism operable to lock said reclining section against pivotal movement thereof when said reclining section is moved relative to said stationary section at a rate of motion in excess of a predetermined desired rate, said auxiliary mechanism comprising a locking pawl pivotally mounted relative to said stationary section, said locking pawl having a portion thereof arranged for sliding engagement with said ratchet means and an oppositely arranged ratchet engaging tooth, spring means urging said sliding portion in engagement with said ratchet means whereby rotation of said ratchet means will operate to alternatively cause engagement and disengagement of said engaging tooth with said ratchet means by pivotal motion of said locking pawl, said engaging tooth operating to remain in engagement with said ratchet means when said ratchet means is rotated in excess of a predetermined rate of rotation.

19. A device according to claim 18 wherein a second pivotable locking pawl is provided, each of said locking pawls operating to engage said ratchet means, respectively, during opposite directions of rotation of said ratchet means.

* * * * *